C. J. LAWSON.
BOTTLE SEALING CAP.
APPLICATION FILED FEB. 29, 1916.

1,209,980.

Patented Dec. 26, 1916

Inventor
Clarence J. Lawson
By his Attorney
Henry K. Williams

UNITED STATES PATENT OFFICE.

CLARENCE J. LAWSON, OF YONKERS, NEW YORK.

BOTTLE-SEALING CAP.

1,209,980.  Specification of Letters Patent.  Patented Dec. 26, 1916.

Application filed February 29, 1916.  Serial No. 81,077.

*To all whom it may concern:*

Be it known that I, CLARENCE J. LAWSON, a citizen of the United States, residing at the city of Yonkers, in the county of Westchester and State of New York, have invented certain new and useful Improvements in Bottle-Sealing Caps, of which the following is a specification, reference being had therein to the accompanying drawings, forming part thereof.

My invention relates to improvements in bottle sealing caps of the crown cap type and my objects are the production of a cap in which the union between the metal shell and the sealing gasket will be reliable, the sealing gasket at the point of sealing will be more elastic and the waste in cutting the protective collet will be eliminated.

I will now describe the embodiment of my invention illustrated in the accompanying drawings and will thereafter point out my invention in claims.

Figure 1:
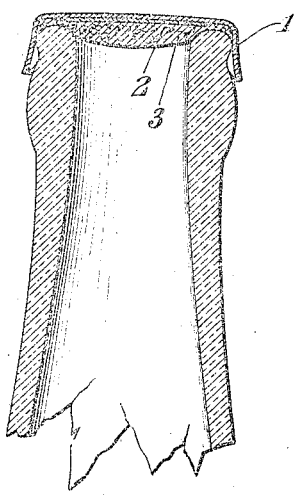
Figure 2:
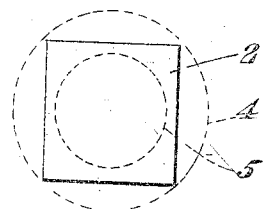
Figure 3:
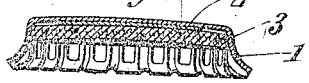

Figure 1 is a sectional view of my improved bottle sealing cap applied to a bottle. Fig. 2 is a face view of the protective collet with dotted lines indicating the outer and inner circles of the bottle neck. Fig. 3 is a sectional view of my improved sealing cap prior to its application to a bottle.

Bottle sealing caps of the type illustrated consist of three members, a metal shell 1 usually made of sheet tin, a protective collet 2, usually made of paper, and a sealing gasket 3 consisting either of a solid cork disk, a composition cork disk, or a rubber disk.

The collets heretofore used have been circular in shape and approximately of the size of the interior of the metal shell. Owing to the fact that these circular shaped collets are punched out of strips of paper, there is necessarily a great deal of waste of material resulting from this circular shape. Furthermore, unless the circular collet is of the same or nearly the same diameter as the interior of the metal shell, it will not center, and the collet will not protect the contents of the bottle from contamination due to the leakage of liquid through the cork gasket to the metal shell.

I make my collet square and of a size such that the diagonal of the square approximates the inside diameter of the shell. Thus all waste of material is eliminated in cutting the collet and the collet on being placed in the shell will be self-centering and that portion of the shell coming over the mouth of the bottle will be covered by the collet. This will be evident from Fig. 2, wherein the outer dotted circle 4 represents the inside circumference of the shell as well as the outer circumference of the bottle neck, and the inner dotted circle 5 represents the inner circumference of the bottle neck.

I impregnate my collet, which I prefer to make of paper, (although any other suitable substance may be used) with a suitable adhesive, such as resin. This adhesive serves to attach the gasket to the shell so that it will remain in place until the cap has been applied to and sealed upon a bottle. The adhesion of the collet to the gasket and the adhesion of the collet to the shell may be and preferably are wholly relied upon for adhesively holding the parts of the cap together. The consequence is that the gasket has no adhesive applied to it or in contact with it at those portions of its surface where the collet is not in contact with it. The cork gasket is, as usual, treated with paraffin and glycerin to make it pliable and impervious. This produces such a condition of pliability that the cap may be applied to a bottle mouth after it has been assembled and made, without any preliminary softening, such as is required in the insertion of ordinary corks. The pliability of these paraffin treated gaskets is impaired by the use of an adhesive, but, according to my invention, this impairment of pliability cannot substantially affect the marginal or sealing portions of the gasket.

It may be further noted that in the practical art of making bottle sealing caps in some instances collets have been employed wherein the collet is non-adhesive or remains non-adhesive until the pasteurization of the sealed bottle. The holding of the cork gasket within the shell before application and sealing of the cap is effected by a slight overhang of the crimps or corrugations of the shell. My invention may be embodied in bottle sealing caps thus made, with all the advantages of economy of material and self-centering.

By making my collet square, I not only am enabled to cut the collets from a strip of paper without any waste at all, but I obtain a self-centering collet and at the same time I leave the outer circumference of the gasket, where it comes in contact with the bottle neck as flexible and pliable as possible. Another advantage in the use of my collet is that the outer margin of the gasket is free to move in any direction necessary to make the seal without first breaking the adhesion to the shell. The four segments outside the surface of the square collet are the portions of this outer margin which are thus free to adjust themselves under the sealing pressure. The corners of the square collet can hardly be said to interrupt the continuity of this free outer margin of the gasket. For all practical purposes this outer margin is free and yet these corners of the adhesive collet, wherein the gasket is adhesively held to the collet and the collet is adhesively held to the shell, supply just sufficient marginal adhesiveness to assure that the parts of the unattached cap will hold together during transportation and storage, while tumbling about in the hopper of the capping machine and up to the time of the application of the sealing pressure which unites them to the bottle head. Under this sealing pressure, the adhesiveness at the corners of the square collet of the outer margin of the gasket may be broken. In any event, the outer margin of the gasket is substantially free under the sealing pressure and a reliable tight sealing is assured.

It is obvious that various modifications may be made in the construction shown in the drawings and above particularly described within the principle and scope of my invention.

I claim:

1. A bottle sealing cap comprising a circular metal shell, a sealing gasket and a collet, the collet having two parallel sides which are located at the extremities of and are perpendicular to a line passing through the center of the collet, such collet being interposed between the gasket and the shell and adapted to center in the shell.

2. A bottle sealing cap comprising a circular metal shell, a sealing gasket and a collet having two sets of parallel sides, the sides of each set being at right angles to the sides of the other set and the collet being interposed between the gasket and the shell and adapted to center in the shell.

3. A bottle sealing cap comprising a circular metal shell, a sealing gasket and a collet, the collet having four corners substantially corresponding to the corners of a square and having a perimeter wherein the lines of two of the sides of the collet are counterparts respectively of the lines of the two opposite sides of the collet, such collet being interposed between the gasket and the shell and adapted to center in the shell.

4. A bottle sealing cap comprising a circular metal shell, a sealing gasket and a collet, the collet having four corners substantially corresponding to the corners of a square and having a perimeter wherein the line of one side of the collet is a counterpart of the line of the opposite side of the collet, such collet being interposed between the gasket and the shell and adapted to center in the shell.

5. A bottle sealing cap comprising a circular metal shell, a sealing gasket and a square-shaped self-centering collet interposed between the gasket and the shell.

6. A bottle sealing cap comprising a circular metal shell, a sealing gasket and an adhesive collet having two parallel sides which are located at the extremities of and are perpendicular to a line passing through the center of the collet, such collet being interposed between and adhering to the gasket and the shell, the gasket and the shell being adhesively united only by the collet.

7. A bottle sealing cap comprising a circular metal shell, a sealing gasket and an adhesive collet having two sets of parallel sides, the sides of each set being at right angles to the sides of the other set, such collet being interposed between and adhering to the gasket and the shell, the gasket and the shell being adhesively united only by the collet.

8. A bottle sealing cap comprising a circular metal shell, a sealing gasket and an adhesive collet having four corners substantially corresponding to the corners of a square and having a perimeter wherein the lines of two of the sides of the collet are counterparts respectively of the lines of the two opposite sides of the collet, such collet being interposed between and adhering to the gasket and the shell, the gasket and the shell being adhesively united only by the collet.

9. A bottle sealing cap comprising a circular metal shell, a sealing gasket and an adhesive collet having four corners substantially corresponding to the corners of a square and having a perimeter wherein the line of one side of the collet is a counterpart of the line of the opposite side of the collet, such collet being interposed between and adhering to the gasket and the shell, the gasket and the shell being adhesively united only by the collet.

10. A bottle sealing cap comprising a circular metal shell, a sealing gasket and a square-shaped self-centering adhesive collet interposed between and adhering to the gasket and the shell, the gasket and the shell being adhesively united only by the collet.

In testimony whereof I have affixed my signature.

CLARENCE J. LAWSON.